No. 730,331. Patented June 9, 1903.

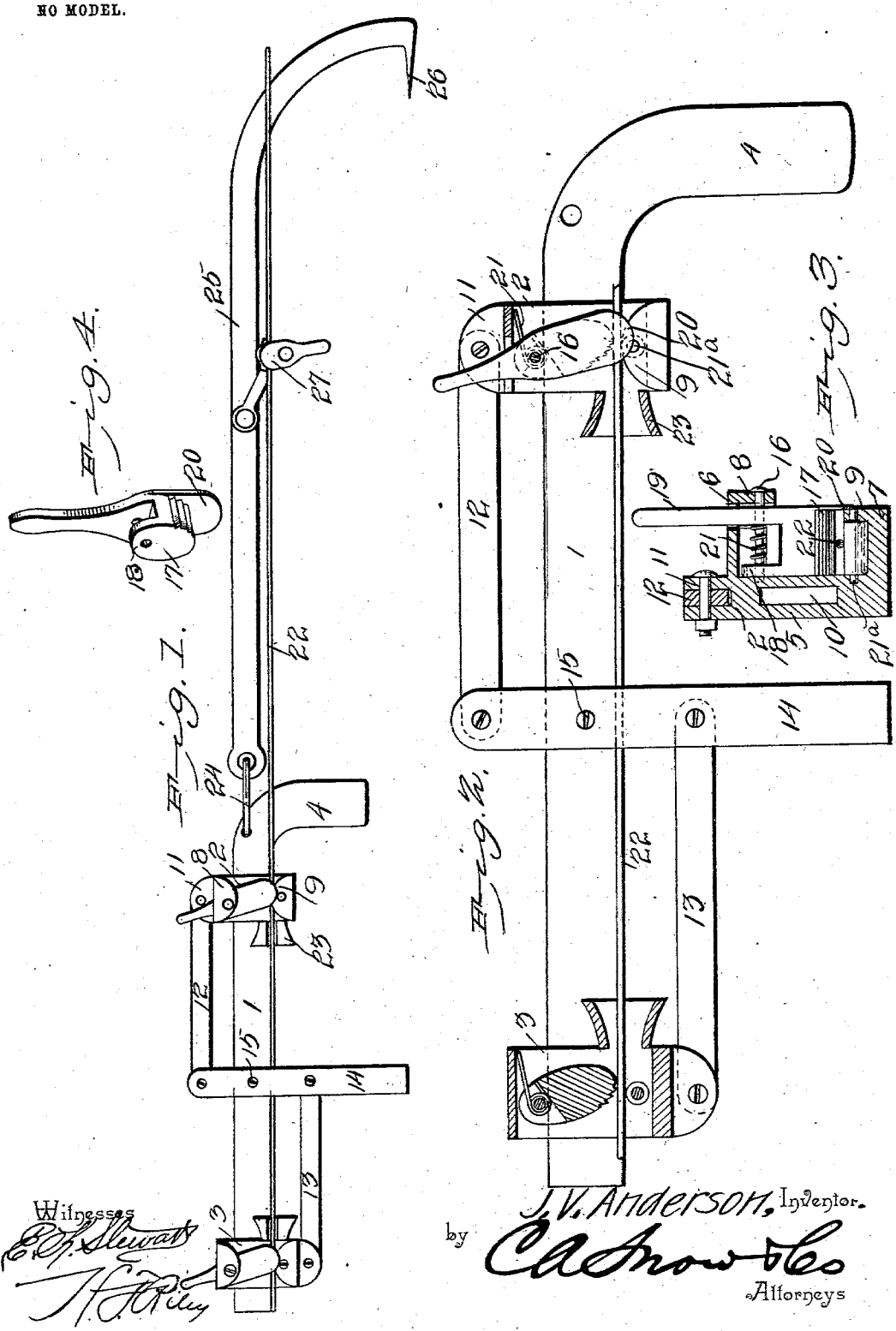

UNITED STATES PATENT OFFICE.

JAMES V. ANDERSON, OF STANTON, NEBRASKA.

WIRE-STRETCHER.

SPECIFICATION forming part of Letters Patent No. 730,331, dated June 9, 1903.

Application filed July 23, 1902. Serial No. 116,677. (No model.)

*To all whom it may concern:*

Be it known that I, JAMES V. ANDERSON, a citizen of the United States, residing at Stanton, in the county of Stanton and State of Nebraska, have invented a new and useful Wire-Stretcher, of which the following is a specification.

The invention relates to improvements in wire-stretchers.

The object of the present invention is to improve the construction of wire-stretchers and to increase their strength, durability, and efficiency and to provide a simple and comparatively inexpensive one capable of being readily operated to produce a continuous stretching of wire and adapted to securely hold the same while the wire is being stapled or otherwise fastened to a fence-post.

A further object of the invention is to improve the construction of the clamps for gripping the wire and to provide a clamp capable of securely gripping and effectually preventing the wire from slipping when it is moved in one direction and which will be capable of readily releasing the wire when it is moved in the opposite direction.

The invention consists in the construction and novel combination and arrangement of parts hereinafter fully described, illustrated in the accompanying drawings, and pointed out in the claims hereto appended.

In the drawings, Figure 1 is a plan view of a wire-stretcher constructed in accordance with this invention. Fig. 2 is an enlarged plan view, partly in section, illustrating the construction of the operating-lever and the movable clamps. Fig. 3 is a transverse sectional view illustrating the construction of the sliding casings and showing the arrangement of the dogs. Fig. 4 is a detail view of one of the dogs.

Like numerals of reference designate corresponding parts in all the figures of the drawings.

1 designates a bar having a longitudinal portion forming a guide for a pair of slidable casings 2 and 3, and the said bar is also provided at one end with a transverse portion 4, forming a grip or handle and adapted to assist the operator in manipulating the wire-stretcher. Each slidable casing consists of a back 5 and sides 6 and 7, approximately L-shaped and having front portions 8 and 9 extending inward toward each other, as clearly shown in Fig. 3 of the drawings. The back 5 is provided with a slot 10 for the reception of the longitudinal portion of the bar, and the said casings are provided at opposite sides of the bar 1 with ears 11, which are perforated for the reception of links 12 and 13 for connecting the casings with an operating-lever 14. The operating-lever 14 is fulcrumed between its ends on the bar 1 by a suitable pivot 15, and the links 12 and 13 are connected with the lever at opposite sides of the pivotal point, whereby the said casings are simultaneously reciprocated in opposite directions when the lever is oscillated. The front portions 8 of the casings are perforated for the reception of screws 16 or other suitable fastening devices for pivoting dogs 17 in the casings, and the inner ends of the screws 16 engage threaded sockets of the backs of the casings; but they may be secured to the casings in any other suitable manner, and any other form of pivot may be employed. The dog, which is provided with an approximately semicircular engaging portion, has a serrated or corrugated engaging face, and it is provided at its inner edge with a perforated ear 18 for the reception of the pivot 16, and it has an arm or handle 19 at its outer face or edge by means of which it may be manipulated by hand. The arm extends through a slot 20 of the side 6 of the casing, and a spring 21 is disposed on the pivot 16 for holding the dog normally in position for engaging a wire 22. The dog is also provided at its outer face adjacent to its engaging corrugated face or edge with a projecting lip 20, adapted to overlap the adjacent front portion 9 of the casing to confine a wire therein, whereby the wire is effectually prevented from becoming accidentally disengaged from the clamp, so that there is no liability of a person becoming accidentally injured while stretching barbed wire. A roller or sleeve is fixed by a bolt or screw $21^a$ between the lip or front portion 9 and the back of the casing to receive the wire and to enable the same to slide readily through the clamp when the same moves backward. The simultaneous movement of the clamps in opposite directions causes the same to move alternately backward and forward, and while one clamp is stretching a wire the other will be moving backward to obtain a fresh hold on the same. Each casing is also preferably provided with a flaring tubular mouth 23, having an opening at one side, as clearly shown in Fig. 2; but these may be omitted, if desired.

The bar 1 is provided adjacent to its transverse portion with a perforation for the reception of a link 24, to which is connected an anchoring-bar 25, having a hook 26 for engaging a post and provided with a clamp 27. The clamp 27, which may be of any desired construction, is adapted for holding a wire while the same is being stapled or otherwise secured to a post.

It will be seen that the wire-stretcher is exceedingly simple and inexpensive in construction, that it possesses great strength and durability, and that it is adapted to be readily operated for stretching fence-wires for fence-building. It will also be apparent that the wire-stretcher is adapted for continuously stretching the fence-wire while the operating-lever is oscillated and that there is no liability of the operator being injured by barbed wire.

What I claim is—

1. A wire-stretcher comprising a guide provided at one end with a transversely-disposed portion forming a handle, an operating-lever fulcrumed on the guide, casings located at opposite sides of the lever and slidably mounted on the guide, links connecting the casings with the lever and located at opposite sides of the fulcrum of the latter, clamping-dogs mounted in the casings, and an anchoring-bar connected with the guide and terminating in a hook and provided with a clamp, substantially as described.

2. A wire-stretcher comprising a guide, casings provided at the back with slots to receive the guide and having oppositely-disposed approximately L-shaped portions, clamping-dogs mounted in the casings, and a lever connected with the casings, substantially as described.

3. In a wire-stretcher, the combination of a bar forming a guide, a casing provided at its back with a slot to receive the guide and having opposite L-shaped portions, one of the L-shaped portions being provided with a slot or opening, a clamping-dog pivotally mounted within the casing at the said slot or opening and having a handle extending through the same, and means for operating the casing, substantially as described.

4. In a wire-stretcher, the combination of a bar forming a guide, a casing provided at the back with a slot to receive the bar and having opposite L-shaped portions, one of the L-shaped portions being slotted, a clamping-dog pivoted within the casing at the slotted L-shaped portion and provided at one end with a perforated ear and with a handle extended through the slotted L-shaped portion, a spring located between the ear and the handle and engaging the clamping-dog, and a fixed roll mounted within the other L-shaped portion of the casing, substantially as described.

5. In a wire-stretcher, the combination of a guide-bar, a casing provided with an opening for the guide-bar slidably mounted on the same and provided at one side of the guide-bar with a flaring tubular portion of less diameter than the casing, a clamping-dog mounted in the casing beyond the tubular portion and arranged to engage a wire passing through the same, and means for operating the casing, substantially as described.

6. In a wire-stretcher, the combination of a guide, a casing having an opening and slidably mounted on the guide and provided at one end with a pair of ears and having a flaring tubular portion provided at one side with an opening and located at one side of the guide, said tubular portion being of less diameter than the casing, a clamping-dog mounted on the casing beyond the flaring tubular portion and arranged to engage a wire passing through the same, an operating-lever, and a link pivoted between the perforated ears and connected with the lever, substantially as described.

In testimony that I claim the foregoing as my own I have hereto affixed my signature in the presence of two witnesses.

JAMES V. ANDERSON.

Witnesses:
GEORGE E. PUGH,
GEORGE YOUNG.